Oct. 30, 1934.  C. A. MATSON  1,978,683
NO ROLL BACK DEVICE
Filed Feb. 18, 1929    2 Sheets-Sheet 1
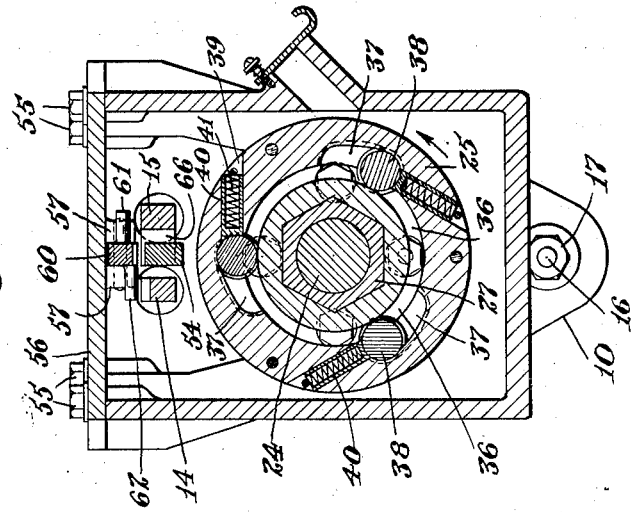
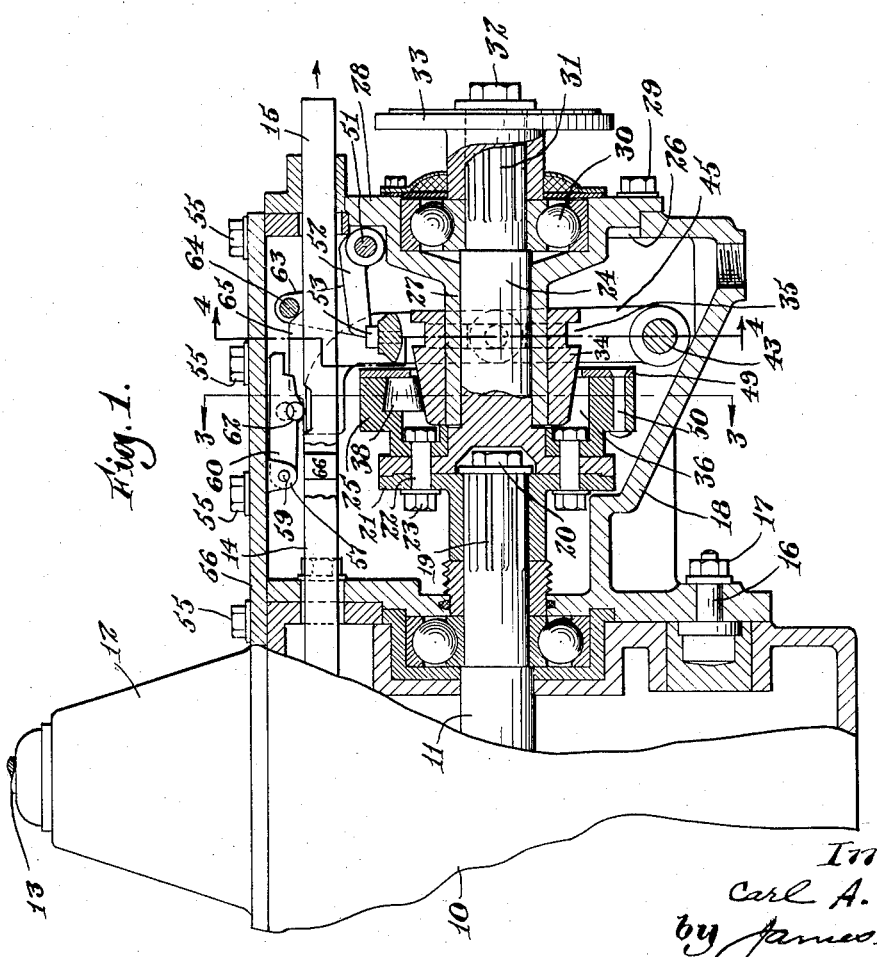
Inventor
Carl A. Matson
by James R. Hodder
    Attorney

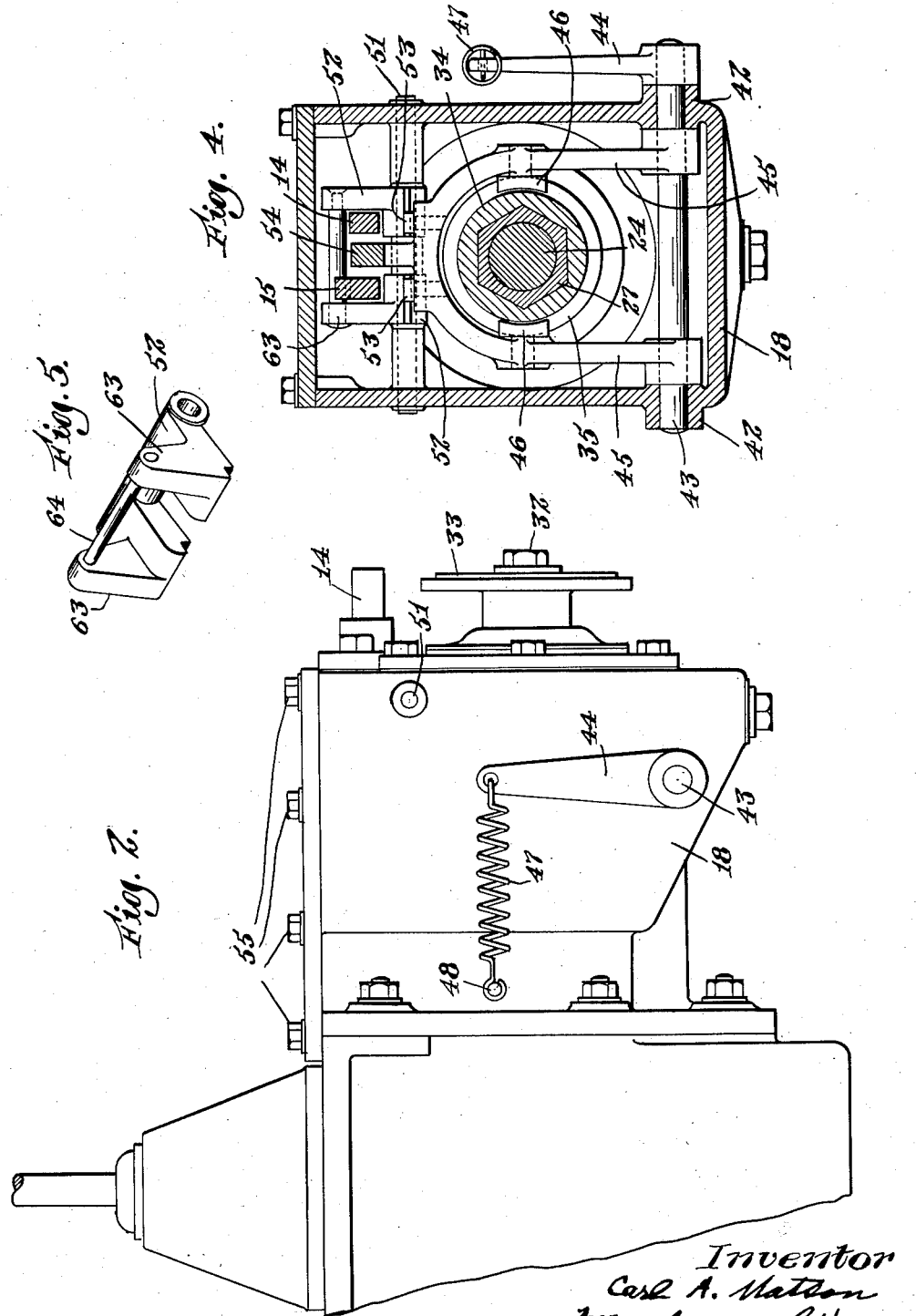

Patented Oct. 30, 1934

1,978,683

UNITED STATES PATENT OFFICE 1,978,683

NO ROLL BACK DEVICE

Carl A. Matson, Lynnfield, Mass., assignor to The Matson Company, Concord, N. H., a corporation of New Hampshire Application February 18, 1929, Serial No. 340,669

15 Claims. (Cl. 192—4)

My present invention relates to braking mechanism and more particularly to an improved automatic reverse brake for automobiles or the like.

In my copending application for automatic reverse brakes, Serial No. 226,970 filed October 18, 1927, I have described and claimed an improved form of automatic reverse brake mechanism and in this, my present invention, I have shown and described an improved braking mechanism which is an improvement on the structure described and claimed in the application above referred to.

The object of my invention, therefore, is an improved automatic reverse brake mechanism for motor vehicles and the like.

In the accompanying drawings illustrating the preferred embodiment of my invention, Fig. 1 is a sectional side elevation;

Fig. 2 is a side elevation;

Fig. 3 is a section on the line 3—3 of Fig. 1;

Fig. 4 is a section on the line 4—4 of Fig. 1, and

Fig. 5 is a perspective view of the brake locking means.

Referring to the drawings, 10 designates a transmission casing carrying the usual transmission gearing and having rotatably mounted therein and as a part thereof a transmission shaft 11. Mounted on the top of the transmission casing 10 is a cover 12 in which is pivotally mounted the control lever 13 for operating slide rods 14 and 15 that are associated with the change gearing within the casing 10. Attached to the rear of the transmission casing 10 by bolts 16 and nuts 17 is a casing 18 in which is housed my improved reverse brake or no-roll-back device. The slide rods 14 and 15 extend rearwardly of the casing 10 and the rear ends thereof find a bearing in the rear wall of the casing 18. Secured to the splined end 19 of the transmission shaft 11 by bolt 20 is a coupling flange 21 and secured to the front face of the coupling flange 21 by bolts 22 and nuts 23 is a rearwardly extending auxiliary transmission shaft 24 and also a rotating member 25 forming part of the no-roll-back device or reverse brake mechanism to be hereinafter described in detail.

The rear wall of the casing 18 is provided with an opening 26 through which opening extends a tubular member 27 that surrounds a portion of the auxiliary transmission shaft 24 and such tubular member 27 is formed integral with a flange 28 that is secured to the rear wall of the casing 18 by bolts 29. Formed in the rear face of the plate 28 is a recess in which is fitted a ball bearing member 30 that forms a rear bearing for the rear end of the auxiliary transmission shaft 24.

Secured to the splined end 31 of the auxiliary transmission shaft 24 by bolt 32 is a flange 33 and by means of which the device may be connected to the usual propeller shaft. The outer peripheral surface of the member 27 is made non-circular and preferably hexagonal, as clearly shown in Fig. 3 and on such non-circular portion is slidably mounted a member 34, such member being tapered at its forward end and provided at its rearward end with an annular groove 35. On the rear face of the member 25 is formed a recess 36 into which the tapered end of the member 34 is normally placed, as clearly shown in Fig. 1. Laterally of the recess 36 and symmetrically disposed about the axis of the auxiliary transmission shaft 24 and within the material of the member 25 are formed recesses 37, such recesses forming, with the tapered end of the member 34, substantially wedge shaped or tapered chambers in each of which is rotatably mounted a roller having the shape of the frustrum of a cone. Engaging with each of the recesses 37 and in the body of the member 25 are passages 39, in each of which is slidably mounted a plunger 40 controlled by a spring 41, such plungers 40 engaging with the tapered rolls 38. The member 34 being mounted on the non-circular member 27 is stationary with regard to the member 25, which is attached to and rotatable with the transmission shaft 11, and as the transmission shaft 11 normally rotates in the direction of the arrow shown in the drawings, and as the member 25 rotates therewith, there is always a tendency on the part of the rolls 38 to move toward the widest part of the recesses 37 and against the plungers 40 that are controlled by the springs 41, and under such circumstances there will be no tendency for the rolls 38 to act as a wedge between the member 25 and the member 34. Therefore, in the normal rotation of the shaft 24, the mechanism above described will not function and will, therefore, permit free rotary movement of the transmission shaft 11. Mounted for rotary movement in suitable bearings 42 in the lower part of the casing 18 is a shaft 43, this shaft at one end extending beyond the casing 18 and having secured at this extended end the lower end of a lever 44. Secured to the shaft 43 within the casing 18 is a yoke member 45 provided with inwardly extending members 46 that engage in the annular groove 35 in the member 34. Secured to the top end of the lever 44 is one end of a coiled spring 47, the other end of this spring being attached to a pin 48 mounted on the casing 18. The spring 47, therefore, tends always to have the yoke 45 slide the member 34 on the non-circular member 27 forward with respect to the mechanism or to the left, as viewed in Fig. 1 and, therefore, to bring the tapered portion of the member 34 into its innermost position in the recess 36. When the rolls 38 have been assembled or placed in the recesses 37, a cover plate 49 for the open end of the member 25 is provided, such cover plate being preferably riveted in position by rivets 50. Secured in the casing 18 and extending transversely of such casing is a shaft 51 on which is rotatably mounted a locking member 52—shown in perspective in Fig. 5—such locking member having its free end engaging with transversely arranged locking bars 53 on the upper end of the yoke 45. The normal position of the locking member 52 is shown in Fig. 1 and is intended to hold the yoke 45 in its forward position and prevent fluttering or chattering of the member 34, which might occur if only the resiliency of the spring 47 were depended upon. Formed integral with the yoke 45 and extending upwardly and forwardly from the upper end of such yoke and between the locking bars 53 is a member 54. Secured to the upper open end of the casing 18 by bolts 55 is a cover 56, and on the lower face of such cover are formed downwardly extending spaced lugs 57. In these lugs is arranged a shaft 59 on which is pivotally mounted a latch 60, and extending laterally outward from either face of the latch 60 are rods 61 and 62 respectively. Formed on the member 52 and at each side thereof are upwardly extending members 63 joined together at their top ends by a rod or shaft 64. Formed on the slide rod 15, which is the so-called reverse slide rod, is a cam 65, which, in the rearward movement of the slide rod 15, is adapted to engage with the shaft 64 and rotate the member 52 about the shaft 51, lifting the locking portion thereof out of engagement with the locking bars 53 on the yoke 45. Formed on or secured to the slide rod 15 is a laterally and inwardly projecting member 66 which is adapted to engage with the front end of the member 54 as the slide bar 15 moves rearwardly and under such circumstances will rotate the yoke 45 on the shaft 43 and thereby moving the member 34 rearwardly or to the right, as viewed in Fig. 1. As the yoke 45 rotates under the conditions above described, the member 54 will be moved upwardly as well as rearwardly and when in its extreme rearward position, will be engaged by the locking end of the locking lever 60 and held in this position until released. When the member 34 is moved rearwardly or to the right, as viewed in Fig. 1, it will be obvious, from an inspection of Fig. 3, that if the transmission shaft 11 is rotated in a direction opposite to that shown in said figures, that there will be a tendency on the part of the rolls 38 to move into the smallest part of the recesses 37, but such recesses or the chambers formed thereby in conjunction with the tapered end of the member 34 are such that when the rolls 38 have reached the extreme position, the housing space therefor will be too great for the rolls to exert any braking or clutching action between the rotating member 25 and the stationary member 34 and, therefore, it being assumed that the reverse slide rod 15 is in its extreme position and, therefore, the reverse gears of the transmission in the housing 10 in mesh, it will be possible to move the automobile or other vehicle to which the device is attached rearwardly without the no-roll-back or braking device functioning. If the reversing action is assumed to have ceased and the operator, by controlling the lever 13, moves the slide rod 15 forwardly or to the left, as shown in Fig. 1, the cam 65 thereon will engage with the laterally projecting rod 61 and the latching lever 60 will be moved upwardly out of engagement with the forward end of the member 54, and the spring 47 functioning, will rotate the yoke 45 on the shaft 43 and will move the member 34 forwardly into its initial position or the position shown in Fig. 1.

Under normal conditions of operation of the device, therefore, that is, when the automobile or other vehicle is moving forwardly, there can be no possible clutching or braking action on the part of the rolls 38 with respect to the rotating member 25 and the stationary member 34. However, with the transmission gears in neutral, or in any forward operating position, if the automobile or other vehicle attempts to move to the rear, the rotation of the rotating member 25 in the direction the reverse of that indicated by the arrow in Fig. 3, will immediately bring the member 25, rolls 38 and stationary member 34 into locking engagement with each other, and rearward movement of the vehicle will be positively prevented. It is possible, however, as above explained to throw the mechanism out of action to permit a rearward movement of the vehicle under certain conditions.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. In a device of the kind described the combination of a rotatable member, a recess formed therein, tapered clutching rolls housed in said recess, a non-rotatable member, a tapered clutching device slidably mounted thereon and movable toward and from said recess to enlarge or restrict the effective area thereof to prevent or permit the rotation of the rotary member in a predetermined direction at will.

2. In a device of the kind described, the combination of a transmission shaft normally rotatable in either direction, a housing secured to and rotatable with said shaft, said housing having a recess formed in one face thereof, said housing also having a plurality of recesses circumferentially arranged therein with respect to and communicating with said first recess, a tapered non-rotatable member movable into and out of said first recess and defining with said plurality of recesses a plurality of variable chambers, a locking roll located in each of said chambers, said housing, rolls and non-rotatable tapered member normally preventing rotary movement of the transmission shaft in one direction, and means for moving the non-rotatable member out of the first said recess, whereby rotary movement of the transmission shaft in the normally prohibited direction is permitted.

3. In a device of the kind described, the combination of a transmission shaft normally rotatable in either direction, a housing secured to and rotatable with said shaft, said housing having a recess formed in one face thereof, said housing also having a plurality of recesses circumferentially arranged therein with respect to and communicating with said first recess, a tapered non-rotatable member movable into and out of said first recess and defining with said plurality of recesses a plurality of variable chambers, a tapered locking roll located in each of said chambers, said housing, rolls and non-rotatable tapered member normally preventing rotary movement of the transmission shaft in one direction, and means for moving the non-rotatable member out of the first said recess, whereby rotary movement of the transmission shaft in the normally prohibited direction is permitted.

4. In a device of the kind described, the combination of a transmission shaft normally rotatable in either direction, a housing secured to and rotatable with said shaft, said housing having a recess formed in one face thereof, said housing also having a plurality of recesses circumferentially arranged therein with respect to and communicating with said first recess, each of said circumferentially arranged recesses having a tapered wall, a tapered non-rotatable member movable into and out of said first recess and defining with said plurality of recesses a plurality of variable chambers, a locking roll located in each of said chambers, said housing, rolls and non-rotatable tapered member normally preventing rotary movement of the transmission shaft in one direction, and means for moving the non-rotatable member out of the first said recess, whereby rotary movement of the transmission shaft in the normally prohibited direction is permitted.

5. In a device of the kind described, the combination of a transmission shaft normally rotatable in either direction, a housing secured to and rotatable with said shaft, said housing having a recess formed in one face thereof, said housing also having a plurality of recesses circumferentially arranged therein with respect to and communicating with said first recess, each of said circumferentially arranged recesses having a tapered wall, a tapered non-rotatable member movable into and out of said first recess and defining with said plurality of recesses a plurality of variable chambers, a tapered locking roll located in each of said chambers, said housing, rolls and non-rotatable tapered member normally preventing rotary movement of the transmission shaft in one direction, and means for moving the non-rotatable member out of the first said recess, whereby rotary movement of the transmission shaft in the normally prohibited direction is permitted.

6. In a device of the kind described, a transmission shaft normally rotatable in either direction, a housing secured to and rotatable with said shaft, said housing having a recess formed in one face thereof, said housing also having a plurality of recesses circumferentially arranged therein with respect to and communicating with said first recess, a second shaft secured to and rotatable with said transmission shaft, a non-rotatable sleeve surrounding a portion of said second shaft and projecting into the first said recess, a non-rotatable member movable on said sleeve into and out of said first recess and defining with said plurality of recesses a plurality of variable chambers, a locking roll located in each of said chambers, said housing, rolls and non-rotatable member normally preventing rotary movement of the transmission shaft in one direction, and means for moving the non-rotatable member out of the first said recess, whereby rotary movement of the transmission shaft in the normally prohibited direction is permitted.

7. In a device of the kind described, a transmission shaft normally rotatable in either direction, a housing secured to and rotatable with said shaft, said housing having a recess formed in one face thereof, said housing also having a plurality of recesses circumferentially arranged therein with respect to and communicating with said first recess, a second shaft secured to and rotatable with said transmission shaft, a non-circular, non-rotatable sleeve surrounding a portion of said second shaft and projecting into the first said recess, a non-rotatable member movable on said sleeve into and out of said first recess and defining with said plurality of recesses a plurality of variable chambers, a locking roll located in each of said chambers, said housing, rolls and non-rotatable member normally preventing rotary movement of the transmission shaft in one direction, and means for moving the non-rotatable member out of the first said recess, whereby rotary movement of the transmission shaft in the normally prohibited direction is permitted.

8. In a device of the kind described, a transmission shaft normally rotatable in either direction, a housing secured to and rotatable with said shaft, said housing having a recess formed in one face thereof, said housing also having a plurality of recesses circumferentially arranged therein with respect to and communicating with said first recess, a second shaft secured to and rotatable with said transmission shaft, a non-rotatable sleeve surrounding a portion of said second shaft and projecting into the first said recess, a tapered, non-rotatable member movable on said sleeve into and out of said first recess and defining with said plurality of recesses a plurality of variable chambers, a tapered locking roll located in each of said chambers, said housing, rolls and non-rotatable member normally preventing rotary movement of the transmission shaft in one direction, and means for moving the non-rotatable member out of the first said recess, whereby rotary movement of the transmission shaft in the normally prohibited direction is permitted.

9. In a device of the kind described, a transmission shaft normally rotatable in either direction, a housing secured to and rotatable with said shaft, said housing having a recess formed in one face thereof, said housing also having a plurality of recesses circumferentially arranged therein with respect to and communicating with said first recess, a second shaft secured to and rotatable with said transmission shaft, a non-circular, non-rotatable sleeve surrounding a portion of said second shaft and projecting into the first said recess, a tapered, non-rotatable member movable on said sleeve into and out of said first recess and defining with said plurality of recesses a plurality of variable chambers, a tapered locking roll located in each of said chambers, said housing, rolls and non-rotatable member normally preventing rotary movement of the transmission shaft in one direction, and means for moving the non-rotatable member out of the first said recess, whereby rotary movement of the transmission shaft in the normally prohibited direction is permitted.

10. In a device of the kind described, a transmission shaft normally rotatable in either direction, a housing secured to and rotatable with said shaft, said housing having a recess formed in one face thereof, said housing also having a plurality of recesses circumferentially arranged therein with respect to and communicating with said first recess, each of said circumferentially arranged recesses having a tapered wall, a second shaft secured to and rotatable with said transmission shaft, a non-rotatable sleeve surrounding a portion of said second shaft and projecting into the first said recess, a tapered, non-rotatable member movable on said sleeve into and out of said first recess and defining with said plurality of recesses a plurality of variable chambers, a tapered locking roll located in each of said chambers, said housing, rolls and non-rotatable member normally preventing rotary movement of the transmission shaft in one direction, and means for moving the non-rotatable member out of the first said recess, whereby rotary movement of the transmission shaft in the normally prohibited direction is permitted.

11. In a device of the kind described, a rotatable member having a recess formed therein, clutching rolls housed in said recess, a non-rotatable member, a tapered clutching device slidably mounted thereon and having an annular groove therein, a yoke, means on said yoke in constant engagement with said groove, resilient means to normally move said clutching device into said recess, and means to positively hold said clutching device in said recess.

12. In a device of the kind described, a rotatable member having a recess formed therein, clutching rolls housed in said recess, a non-rotatable member, a tapered clutching device slidably mounted thereon and having an annular groove therein, a yoke, means on said yoke in constant engagement with said groove, resilient means to normally move said clutching device into said recess, means to positively hold said clutching device in said recess, and means to release said last named means from holding position, and means to move said clutching device out of said recess.

13. An improved automatic reverse brake for automobiles and the like, comprising a transmission including a transmission shaft, an enclosing casing for the transmission, an auxiliary enclosing casing attached to the transmission casing, a housing secured to and rotatable with said shaft, said housing having a recess formed in one face thereof, said housing also having a plurality of recesses circumferentially arranged therein with respect to and communicating with said first recess, a second shaft secured to and rotatable with said transmission shaft, a non-circular, non-rotatable sleeve surrounding a portion of said second shaft and projecting into the first said recess, a tapered non-rotatable member movable on said sleeve into and out of said first recess and defining with said plurality of recesses a plurality of variable chambers, said housing, rolls and non-rotatable member normally preventing rotary movement of the transmission shaft in one direction, said non-rotatable member having an annular groove therein, a shaft mounted in said auxiliary casing, a yoke rotatably mounted on said last named shaft, means on said yoke in constant engagement with said groove, resilient means associated with said yoke to normally move said non-rotatable member into said first recess, a latch rotatably mounted in said auxiliary casing and adapted to engage said yoke to hold said non-rotatable member in its innermost position, a rod on said latch member, cam operated means adapted to engage said rod to release said latch from its holding position, and means automatically operable to rotate said yoke on its shaft to withdraw said non-rotatable member from said first recess, whereby rotary movement of the transmission shaft in the normally prohibited direction is permitted.

14. Rotary locking apparatus including two members adjacent each other, a raceway formed on each member, rolling members interposed between the raceways, the raceway of one member being spiralled and angled with respect to an axis of the other member, and means for selectively moving one of the members in opposite directions lengthwise of said axis.

15. Rotary locking apparatus including an inner member having an outer raceway formed thereon, and an outer member having an inner raceway formed thereon, rolling members interposed between the raceways, the raceway of one member being spiralled and angled with respect to an axis of the other member, and means for selectively moving one of the members in opposite directions lengthwise of said axis.

CARL A. MATSON.